May 24, 1932.   J. A. SPENCE   1,859,806
LAWN EDGE TRIMMER
Filed July 14, 1931
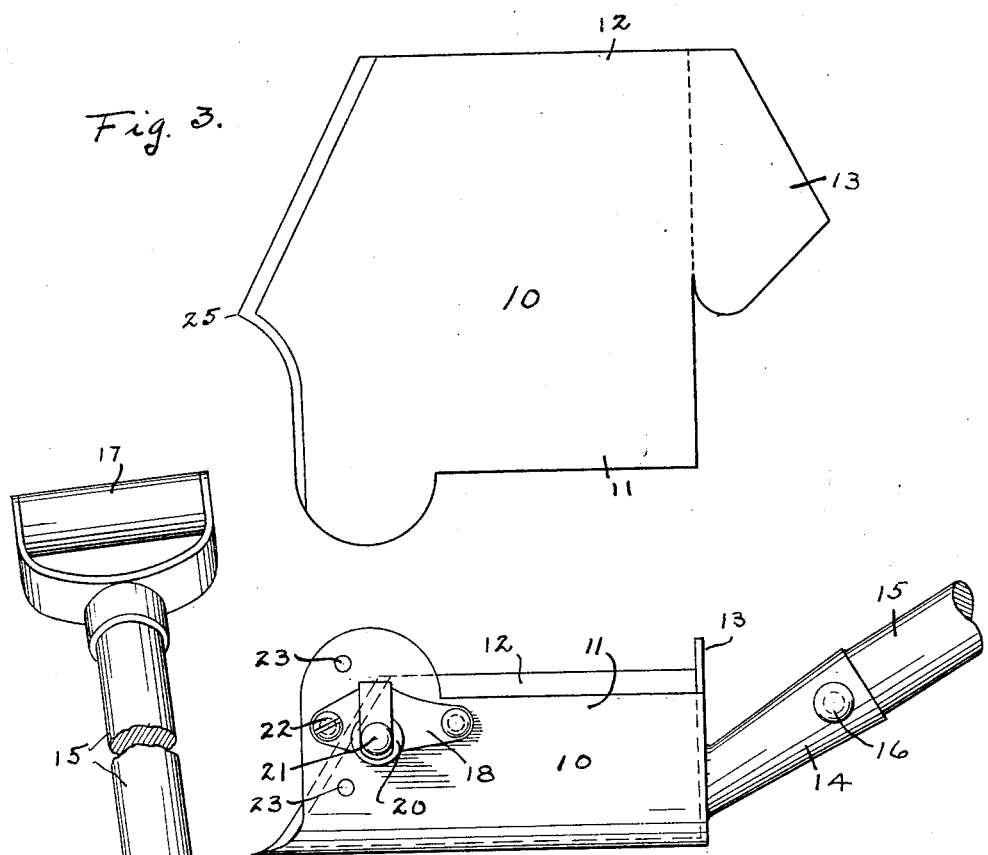
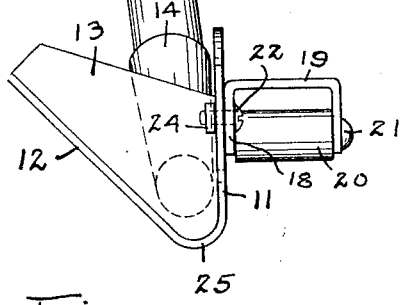
Inventor,
John A. Spence,
By Minturn & Minturn,
Attorneys.

Patented May 24, 1932

1,859,806

UNITED STATES PATENT OFFICE

JOHN A. SPENCE, OF INDIANAPOLIS, INDIANA

LAWN EDGE TRIMMER

Application filed July 14, 1931. Serial No. 550,734.

This invention relates to the art of trench cutters and lawn edge trimmers and has for one of its primary objects the forming of such a device that will be in the nature of a scoop whereby the edge trimmings will not be plowed out to one side but will remain in the cutter to permit the trimmings to be lifted directly and dumped into some receptacle, such for example as a basket.

Another primary object of the invention is to form the trimmer not only in the shape of a scoop but also to mount a roller gauge at one side near the forward end and to attach a handle on the rear end toward the underside whereby the front cutting edge of the device is not changed appreciably in elevation upon the usual raising and lowering of the handle while the trimmer is being pushed. The mounting of the handle as indicated also gives a better balance to the device and permits it to be readily inverted and the contents dumped.

A further object of the invention is to form it of a minimum number of parts to permit a very low cost of production and selling price.

A still further object of the invention is to provide a quickly adjustable roller gauge near the forward end of the trimmer positioned remotely from the handle attachment whereby the cutting edge of the trimmer may be raised and lowered a definite amount.

These and other objects will become apparent in the following description of the invention as illustrated in the accompanying drawings, in which Fig. 1 is a front elevation of a trimmer embodying my invention;

Fig. 2, a fragmentary side elevation;

Fig. 3, a blank from which the body of the trimmer is formed.

Like characters of reference indicate like parts in the several views in the drawings.

Employing suitable material, I develop a piece of metal to form the body 10 of the shape as indicated in Fig. 3.

This metal is bent around to shape the body 10 to have a vertically disposed wall 11 from the under side of which the metal is curved around upwardly and outwardly to form the sloped wall 12. The end 13 is bent around from the rear wall 12 to form a rear closure between the walls 12 and 11 to have the free edge of the end 13 welded to the rear end of the wall 11.

A tubular socket 14, preferably tapered, is welded by its smaller end to the outside of the end 13 and toward the bottom thereof to slope upwardly therefrom and to have its axis at a slight angle from the side 11. A handle 15 is fitted by its lower end into the socket 14 and a rivet 16 is passed through the socket and handle end to retain the handle in place. The upper end of the handle 15 is preferably formed to have the usual spade grip 17.

A plate 18 is rockably secured on the outer side of the wall 11 toward its forward end and carries a strap 19 which extends from the upper edge of the plate horizontally away from the wall 11 and thence downward. A roller 20 of appreciable length is rotatably carried on a rivet 21 between the plate 18 and the downturned end of the strap 19. The forward end of the plate 18 has a hole therethrough to receive a bolt 22 and a number of holes 23, here shown as three in number, are spaced about circumferentially in the wall 11 to selectively receive the bolt 22 therethrough as a means of holding the plate 18 at various positions in order to permit raising and lowering of the roller 20. The bolt 22 is secured through the plate 18 and the wall 11 in the respective holes by nut 24. The upper edge of the wall 11 is here shown as having an ear through which the small hole 23 is placed in order to permit the maximum raising of the plate 18 without having to make the entire wall 11 of the same height as that of the top of the ear.

The forward edges of the walls 11 and 12 are sharpened to form cutting edges and the forward vertical edge of the wall 11 is somewhat back of the point 25 which projects forwardly at the lowest point in the curved section of the metal between the two walls. In operation, the plate 18 is rocked to bring the roller 20 at the desired distance above the bottom of the trimmer and is secured by the bolt 22 as above indicated. The trimmer is then pushed along the edge of the lawn, usually at the edge of a walk, to have the roller 20 roll along the walk edge and the wall 11 in immediate contact with the side thereof. As the trimmer is pushed ahead, the dirt plowed loose and carried into the body 10 remains therein and when the body is filled, it is raised upwardly by the rocking downwardly of the handle 15 to raise the forward point 25 and break off the turf so that the contents may then be lifted up and dumped into any suitable receptacle at hand. The same operation is repeated until the desired length of trench is formed.

By reason of the handle 15 being sloped outwardly from the wall 11, forward pushing on the handle tends to keep the wall 11 in close contact with the sidewalk edge so that an even straight trench is formed and the trimmer has no tendency to cut out away at an angle from the walk.

While I have here shown and described my invention in the best form as now known to me, it is obvious that structural changes may be made without departing from the spirit of the invention and I, therefore, do not desire to be limited to that precise form, nor any more than may be required by the following claims.

I claim:

1. A trench cutter comprising a scoop with a vertical side wall, a sloped side wall, a narrow rounded bottom therebetween, the bottom being extended forwardly of the walls to a sharpened point, a rear end forming a closing wall between the two side walls, a handle having its lower end secured to near the bottom of said rear end and sloping upwardly therefrom, and a roller carrying plate rockably carried by the vertical side wall at its forward end.

2. A trench cutter comprising a scoop with a vertical side wall, a sloped side wall, a narrow rounded bottom therebetween, the bottom being extended forwardly of the walls to a sharpened point, a rear end forming a closing wall between the two side walls, and a handle having its lower end secured to near the bottom of said rear end and sloping upwardly therefrom, said handle being secured also to slope outwardly away from the plane of said side wall, and a roller carrying plate rockably adjustable at the forward end of the vertical wall.

In testimony whereof I affix my signature.

JOHN A. SPENCE.